United States Patent Office 2,793,363
Patented May 21, 1957

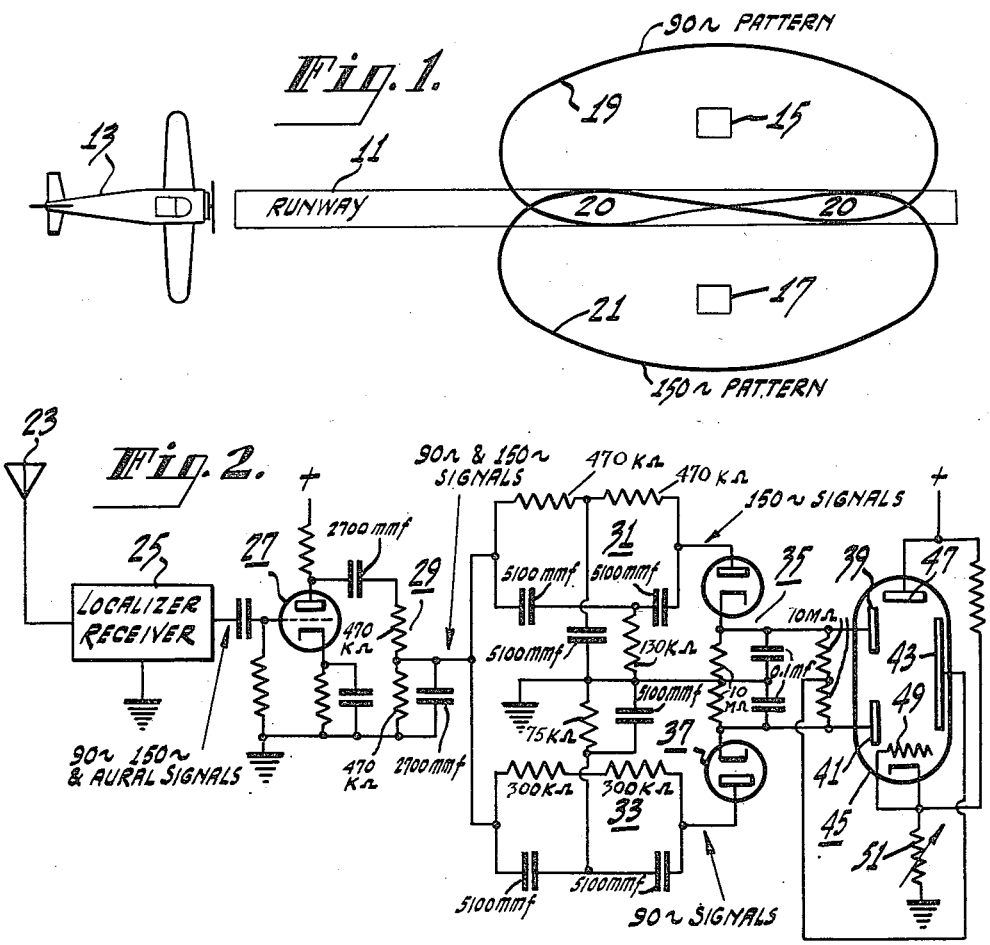

2,793,363

INSTRUMENT LANDING SYSTEM RECEIVER APPARATUS

George W. Gray, Lambertville, N. J., assignor to Radio Corporation of America, a corporation of Delaware Application March 30, 1953, Serial No. 345,415

8 Claims. (Cl. 343—107)

This invention relates generally to radio navigation systems and particularly to improved radio receiving apparatus for use in aircraft instrument landing systems.

In presently known instrument landing systems, commonly referred to as ILS systems, a pair of radiating antennas are located on opposite sides of the runway which is to be used by a landing aircraft. The antennas are excited at the same V. H. F. (very-high-frequency) carrier frequency but transmit different modulation signals. For example, one antenna transmits the V. H. F. carrier wave amplitude-modulated by a 90 cycle per second modulation signal. The other antenna transmits the V. H. F. carrier wave amplitude-modulated by a 150 cycle per second modulation signal. Each of these radiating units provides a directive pattern, the two patterns overlapping to provide a zone the center of which defines an "on-course" flight path for landing.

At the receiver carried by the airborne landing craft these 90 and 150 cycle per second modulation signals are separated from the carrier wave and are applied to detector circuits wherein the signals are compared in amplitude. Unequal signal amplitudes indicates that the craft has drifted from the desired approach path while equality of the signal amplitudes indicates that the craft is on-course and is in proper position in relation to the runway for landing.

A number of ILS receivers presently in use employ zero center left-right indicators such as meters for indicating balance or unbalance between the amplitudes of the 90 and 150 cycle modulation signals. Such meters generally are not preferred for several reasons. They are costly, relatively large in size, and frequently the meter's magnet interferes with the plane's compass. Moreover, since these meters present low impedances they therefore should be energized from low impedance filter units. Such filter units generally are expensive and include iron core inductances. A further disadvantage of the above arrangement is that a complete loss of the transmitted modulation signals results in an erroneous and misleading on-course indication which is thus not fail-safe.

An object of the invention is to provide improved radio receiving apparatus for use in facilitating instrument landings of aircraft.

Another object of the invention is to eliminate ambiguous indicator readings in instrument landing system receiver apparatus.

Another object of the invention is to provide separate and distinct visual indications to enable a pilot to ascertain when he has drifted from a prescribed flight path for landing and when he has "lost" the ground station landing signals.

A further object of the invention is to provide improved receiving apparatus for a landing system of the above type in which relatively inexpensive high impedance filters may be used.

A further object of the invention is to provide radio receiving apparatus for use in an aircraft instrument landing system and having improved signal amplitude comparison and indicator circuits.

A still further object of the invention is to provide ILS receiving apparatus which requires less driving power than presently known receivers.

These and other objects and advantages of the instant invention may be accomplished by improved instrument landing system receiving apparatus. This apparatus includes improved signal comparison and indication circuitry for obviating the above mentioned undesirable features. The improved circuitry hereinafter disclosed and claimed is simple, relatively inexpensive, requires less driving power than other circuits performing similar functions, and provides different and distinct indications for no-signal and on-course conditions.

The invention will be described in greater detail with reference to the accompanying drawing in which:

Figure 1 is a horizontal plan view illustrating the arrangement of ground station transmitting antennas associated with a landing runway for producing radiation patterns for defining a landing path for aircraft;

Figure 2 is a schematic circuit diagram partially in block form of instrument landing system receiving apparatus, according to the invention; and Figure 3–a through 3–d are indicator presentations for various flight and signal conditions.

Figure 1 shows a runway 11 upon which aircraft such as 13 normally land. Spaced from one end and at opposite sides of the runway 11 are antennas 15 and 17 excited at a given V. H. F. carrier frequency. The antenna 15 radiates the V. H. F. carrier wave which has a 90 cycle per second amplitude modulation component signal impressed thereon. The resulting wave pattern produced is directive and is approximately in the form of a cardioid 19. Antenna 17 radiates electrical energy at the same V. H. F. carrier frequency as antenna 15 but in this instance the carrier wave is amplitude-modulated by a modulation signal of 150 cycles per second. The directive pattern produced is also directive and is in the form of a cardioid 21. The cardioid patterns 19 and 21 overlap to provide a zone 20 the center of which extends along and beyond the landing runway 11.

The receiver apparatus carried by the aircraft 13 is shown in Figure 2. The 90 and 150 cycle per second signals and aural information (also transmitted by the ground station) all amplitude-modulate the V. H. F. carrier wave. The modulated carrier wave is intercepted at the antenna 23 of the airborne receiver 25. In the receiver the modulated V. H. F. carrier is amplified and subsequently demodulated. The modulation signals recovered in the demodulation operation are supplied at the receiver output terminals. The modulation signals are then amplified in an audio amplifier stage 27 and applied to a tuned bandpass filter circuit 29. Filter circuit 29 is a low-Q tuned circuit which is tuned to a frequency of approximately 116 cycles per second (the geometric mean frequency between 90 and 150 cycles per second). Under these conditions the filter 29 acts as a bandpass filter for the 90 and 150 cycle signal and effectively rejects aural signals (usually 400 cycles per second or greater) and other signals not herein utilized.

The 90 and 150 cycle modulation signals then are applied to separate high impedance filter units 31 and 33. The filters 31 and 33 may be of the bandpass type which are differently tuned to pass the above signals. Preferably, however, they are twin-T band rejection filters. Such filters are less expensive than and, in the instant example, perform the same function as conventional bandpass filters. Filter 31 is tuned to reject the 90 cycle per second signals while filter 33 is tuned to reject 150 cycle per second signals.

Therefore 150 cycle signals appear at the output of filter 31 and 90 cycle signals appear at the output of filter 33. The signals thus filtered are applied to peak detector circuits 35 and 37, respectively, which produce direct-current voltages having amplitude levels which are proportional to the amplitudes of the signals applied to the inputs of the detectors. The direct-current potentials derived from the detectors 35 and 37 are then applied to deflection electrodes 39, 41, and 43 of an electron ray tube 45 which provides an indication of the relatives amplitudes of the D.-C. potentials. An indicator device which may be used in the above circuit is the 6AL7 tube which frequently is employed in other systems as an F-M tuning indicator.

With the aircraft 13 shown in Figure 1 in an "on-course" position for landing on the runway 11, the signal strengths of the modulated carrier signals radiated by ground station antennas 15 and 17 and received by the aircraft 13 are equal. The amplitudes of the demodulated 90 and 150 cycle signals also are equal as are the D.-C. potentials derived from peak detectors 35 and 37. These equal D.-C. potentials are applied between deflection electrodes 39 and 43 and between electrodes 41 and 43 thereby deflecting the electron beam of the tube 45 so that it strikes a fluorescent target 47 in the tube to provide a visual indication as shown in Figure 3–a.

If the craft 13 is off-course for landing and is to the left of the runway 11 the received signal strength of the 90 cycle per second modulation signals is greater than the received signal strength of the 150 cycle per second signals. The positive D.-C. potential applied between electrodes 41 and 43 is then greater than the positive D.-C. potential applied between electrodes 39 and 43 and the fluorescent target 47 provides the visual indication shown in Figure 3–b. With the craft off-course to the right of the runway 11 the received signal strength of the 150 cycle modulation signals is greater than that of the 90 cycle signals, the D.-C. potential applied between electrodes 39 and 43 is greater than the D.-C. potential applied between electrodes 41 and 43, and the visual indication shown in Figure 3–c is provided. A potentiometer 51 comprises part of a voltage divider and may be adjusted to control the sensitivity of indication of the tube 45.

In the event that the ground station transmitting equipment fails or that the airborne receiver "loses" the 90 and 150 cycle modulation signals, the D.-C. potentials applied between deflection electrodes 39 and 43 and between electrodes 41 and 43 decreases to substantially zero volts and the fluorescent screen 47 provides the indication shown in Figure 3–d of the drawing. This presentation is different from and may be compared with the on-course presentation illustrated in Figure 3–a. Alternatively, the connection to the deflection electrode 43 and the connection to the control electrode 49 of tube 45 may be interchanged. Under these conditions the tube 45 will be cut off when signal is lost and no indication is provided by the fluorescent screen 47.

From the foregoing description it will be seen that loss of the V. H. F. carrier or modulation signals transmitted by the ground station does not result in an erroneous and misleading on-course indication as is the case in present ILS receiving systems. Distinct visual indications are provided according to the instant invention for each of the above conditions. Since the visual indicator device herein provided has high impedance, high impedance filters may be employed with the result that less driving power is necessary for the equipment operation. Moreover, the filter circuitry and signal comparison and indication circuitry heretofore disclosed is simpler and more compact physically than circuitry performing related functions in existing ILS receivers.

What is claimed is:

1. For use in a radio beacon system for guiding a craft along a given course line which system includes ground station means arranged in spaced relation on opposite sides of said course line for radiating a carrier wave modulated by different modulation signals to provide overlapping field patterns of substantially equal signal strengths along said course line and unequal signal strengths at positions remote from said course line, and an airborne receiver for receiving and demodulating said carrier wave to reproduce said modulation signals with amplitudes proportional to the signal strengths of said field patterns at the point of signal reception; the improvement comprising, high impedance filter means coupled to said receiver for separating said modulation signals according to their respective signal frequencies, and a common high impedance electron discharge type display device coupled to said high impedance filter means for providing a distinctive indication of the amplitudes of each of said modulation signals.

2. For use in a radio beacon system for guiding a craft along a given course line which system includes ground station means arranged in spaced relation on opposite sides of said course line for radiating a carrier wave modulated by different modulation signals to provide overlapping field patterns of substantially equal signal strengths along said course line and unequal signal strengths at positions remote from said course line, and an airborne receiver for receiving and demodulating said carrier wave to reproduce said modulation signals with amplitudes proportional to the signal strengths of said field patterns at the point of signal reception; the improvement comprising, high impedance filter means coupled to said receiver for separating said modulation signals according to their respective signal frequencies, detector means coupled to said filter means for producing direct-current voltages having amplitude levels proportional to the amplitudes of said received and filtered modulation signals, and a common high impedance electron discharge type display device coupled to said detector means for providing a visual indication of the amplitudes of each of said direct-current voltages.

3. For use in a radio beacon system for guiding a craft along a given course line which system includes ground station means arranged in spaced relation on opposite sides of said course line for radiating a carrier wave amplitude-modulated by a pair of modulation signals to provide overlapping field patterns of substantially equal signal strengths along said course line and unequal signal strengths at positions remote from said course line, and an airborne receiver for receiving and demodulating said carrier wave to reproduce said pair of modulation signals with amplitudes proportional to the signal strengths of said field patterns at the point of signal reception; the improvement comprising a pair of filters for separating said modulation signals according to their respective signal frequencies, detector means coupled to said filters for producing direct-current voltages having amplitude levels proportional to the amplitudes of said modulation signals, and a common high impedance electron discharge type display device having a fluorescent screen for displaying thereon a visual indication of the amplitudes of each said direct-current voltages.

4. Apparatus as claimed in claim 3 wherein said high impedance filters comprise twin-T band rejection filters.

5. Apparatus as claimed in claim 3 wherein said discharge device includes means for visually indicating on said screen lack of normal reception of said modulation signals.

6. For use in a radio beacon system for guiding a craft along a given course line which system includes ground station means arranged in spaced relation on opposite sides of said course line for radiating a carrier wave amplitude-modulated by a pair of course guidance modulation signals to provide overlapping field patterns of substantially equal signal strengths along said course line and unequal signal strengths at positions remote from said course line, said carrier wave also being amplitude-modulated by signals for conveying aural information, and an airborne receiver for receiving and demodulating said carrier wave to derive said aural information signals and reproduce said pair of modulation signals with amplitudes proportional to the signal strengths of said field patterns at the point of signal reception; the improvement comprising, a circuit coupled to said receiver for passing said course guidance signals and rejecting said aural information signals, a pair of high impedance filters coupled to said circuit for separating said modulation signals according to their respective signal frequencies, and a common high impedance electron discharge type display device coupled to said filters for providing a simultaneous indication both of the amplitudes and the relative amplitudes of said course guidance modulation signals.

7. Apparatus as claimed in claim 6 wherein said circuit for passing said course guidance signals and rejecting said aural information signals comprises a low-Q tuned circuit.

8. Apparatus as claimed in claim 7 wherein said circuit is tuned to a signal frequency which is approximately the geometric mean between the signal frequencies of said course guidance signals.

References Cited in the file of this patent

UNITED STATES PATENTS

| | | |
|---|---|---|
| 2,264,063 | Bond | Nov. 25, 1941 |
| 2,312,747 | Bond | Mar. 2, 1943 |
| 2,350,284 | Luck | May 30, 1944 |
| 2,418,284 | Winchel et al. | Apr. 1, 1947 |
| 2,458,310 | Southeimer | Jan. 4, 1949 |
| 2,553,558 | Earp | May 22, 1951 |